US012638617B2

(12) United States Patent (10) Patent No.: US 12,638,617 B2
Tsai et al. (45) Date of Patent: *May 26, 2026

(54) OPTICAL LENS DEVICE HAVING A PHYSICALLY FORMED POLARIZATION MINIATURE STRUCTURE AND METHOD THEREOF

(71) Applicant: FORESIGHT OPTICAL LTD., Tainan (TW)

(72) Inventors: Yue-Chang Tsai, Tainan (TW); Tien-Shu Wu, Tainan (TW); Yen-Ting Wu, Tainan (TW); Lai-Chun Chou, Tainan (TW)

(73) Assignee: FORESIGHT OPTICAL LTD., Tainan (TW)

( * ) Notice: Subject to any disclaimer, the term of this patent is extended or adjusted under 35 U.S.C. 154(b) by 731 days.

This patent is subject to a terminal disclaimer.

(21) Appl. No.: 17/828,855

(22) Filed: May 31, 2022

(65) Prior Publication Data

US 2022/0381956 A1 Dec. 1, 2022

(30) Foreign Application Priority Data

May 31, 2021 (TW) .................................. 110119705

(51) Int. Cl.
*G02B 3/08* (2006.01)
*F21V 8/00* (2006.01)
*G02B 5/04* (2006.01)
*G02B 5/30* (2006.01)

(52) U.S. Cl.
CPC ............... *G02B 3/08* (2013.01); *G02B 5/045* (2013.01); *G02B 5/30* (2013.01); *G02B 5/3025* (2013.01); *G02B 6/0053* (2013.01)

(58) Field of Classification Search
CPC ... G02F 1/133536; G02B 5/30; G02B 6/0053; G02B 5/045
See application file for complete search history.

(56) References Cited

U.S. PATENT DOCUMENTS

| 5,258,871 A * | 11/1993 | Gupta | ................ G02B 27/4261 |
| | | | 359/569 |
| 10,831,061 B1 * | 11/2020 | Patel | ................ G02F 1/133615 |
| 2008/0100913 A1 * | 5/2008 | Hwang | ................ G02B 6/0053 |
| | | | 359/493.01 |
| 2008/0186738 A1 * | 8/2008 | Kim | .................... G02B 6/0053 |
| | | | 264/1.24 |

* cited by examiner

*Primary Examiner* — Alexander P Gross
(74) *Attorney, Agent, or Firm* — Che-Yang Chen; Law Office of Michael Chen

(57) ABSTRACT

An optical lens device includes an optical substrate layer, an optical polarization layer and a miniature surface structure. The optical substrate layer has a first surface and a second surface and rays of light passes through the optical substrate layer. The optical polarization layer is provided on the first surface or the second surface of the optical substrate layer. The miniature surface structure is physically processed to form the optical polarization layer and provides a characteristic of optical polarization in the optical polarization layer. The miniature surface structure of the optical polarization layer provides an optical polarization effect to the rays of light while passing through it.

20 Claims, 4 Drawing Sheets

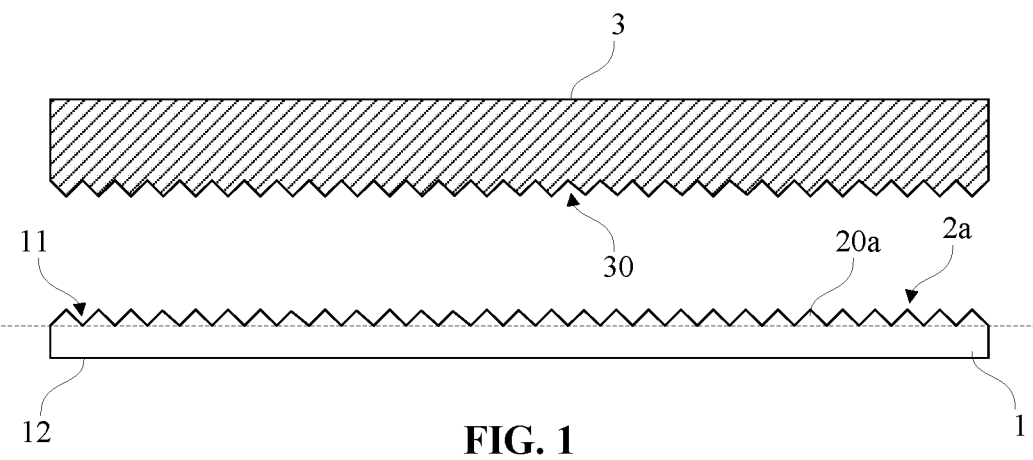

FIG. 1

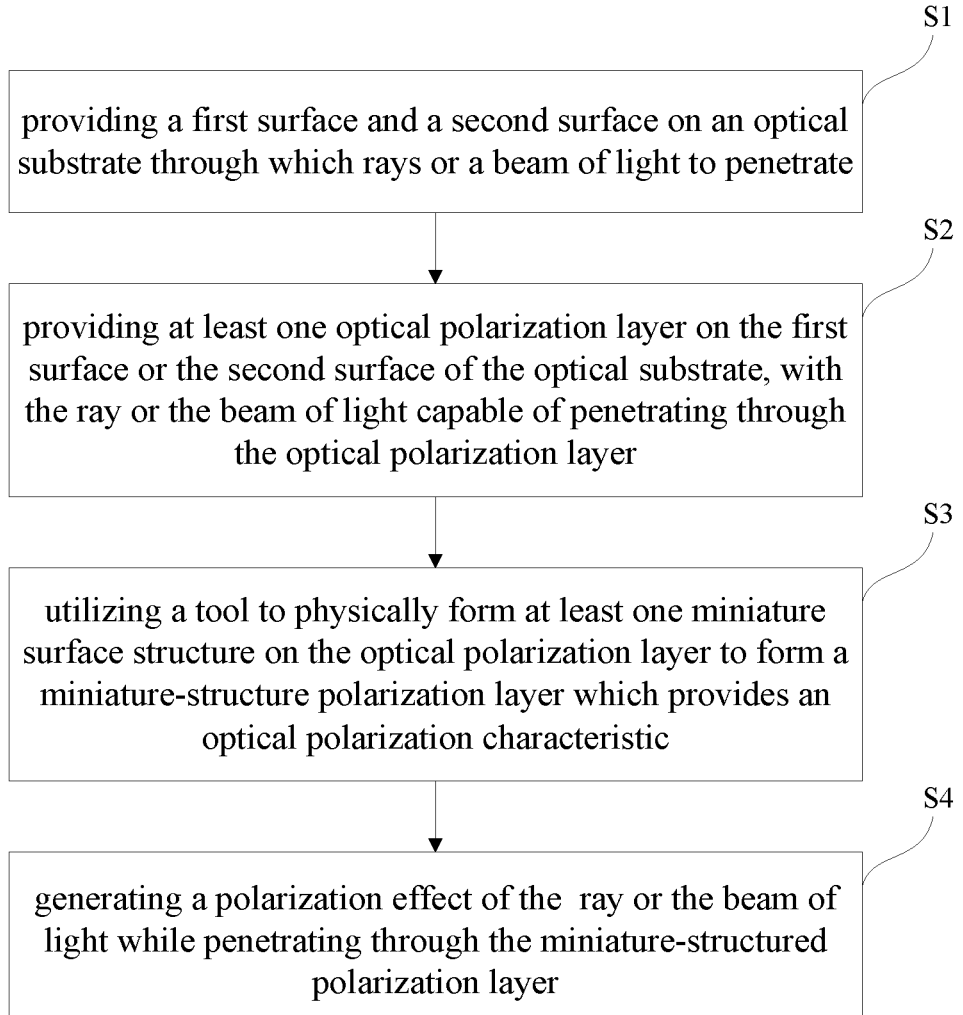

S1 providing a first surface and a second surface on an optical substrate through which rays or a beam of light to penetrate

S2 providing at least one optical polarization layer on the first surface or the second surface of the optical substrate, with the ray or the beam of light capable of penetrating through the optical polarization layer

S3 utilizing a tool to physically form at least one miniature surface structure on the optical polarization layer to form a miniature-structure polarization layer which provides an optical polarization characteristic

S4 generating a polarization effect of the ray or the beam of light while penetrating through the miniature-structured polarization layer

FIG. 2

OPTICAL LENS DEVICE HAVING A PHYSICALLY FORMED POLARIZATION MINIATURE STRUCTURE AND METHOD THEREOF

BACKGROUND OF THE INVENTION

1. Field of the Invention

The present invention relates to an optical lens device having a physically formed polarization miniature structure and method thereof. Particularly, the present invention relates to the optical lens device having a physically formed polarization microstructure and method thereof. More particularly, the present invention relates to the optical lens device having a physically formed polarization miniature pattern structure or microstructure and operation or manufacturing method thereof.

2. Description of the Related Art

Taiwanese Patent Publication No. TW-556286, entitled "Manufacturing method of micro lens," discloses a manufacturing method of producing micro lens for an optical device comprises: coating a thermoplastic organic material layer on a flat substrate or adhering the thermoplastic organic material layer to the flat substrate.

The manufacturing method of producing micro lens for an optical device further comprises: in a laser etching operation, using a laser beam to directly remove some unwanted portions from the thermoplastic organic material layer by vaporization and to thereby remain a desire pellet-like pattern formed thereon.

The manufacturing method of micro lens for producing an optical device further comprises: in softening operation, heat-treating the remained pellet-like pattern of the thermoplastic organic material layer formed on the flat substrate, thereby forming a spherical surface or a cambered surface on a surface of the thermoplastic organic material layer.

The manufacturing method of producing micro lens for an optical device further comprises: in plating operation, plating a conductive metal thin layer on the surface of the thermoplastic organic material layer which is further provided to form an injection mold mechanism, with cooperating with an injection molding machine, in an injection operation, to produce a substrate panel which is formed with a micro lens.

However, the above-mentioned injection mold mechanism and the manufacturing method thereof or the above substrate panel with the micro lens produced thereby cannot be possibly performed as an optical polarization mechanism of lens devices or further successfully modified to provide an optical polarization mechanism of lens devices.

Further, Taiwanese Patent Application Publication No. TW-201041712, entitled "Mold core, mold apparatus and method for press-molding micro concave lens array," discloses a mold core for a press-molding micro concave lens array. The mold core has an end surface on which a plurality of spacers is formed.

Each of spacers has a top surface which is formed in an identical level with the end surface of the mold core. Each of spacers further defines a mold cavity therein and can be utilized to form a micro concave lens in press-molding operation.

A convex surface is formed in an inner space of the mold cavity for press-molding operation and is also protruded upward from a bottom surface of the mold cavity. The convex surface also has a highest point which is lower than a top surface of the mold cavity.

However, the above-mentioned mold core, mold apparatus thereof and manufacturing method thereof for the press-molding micro concave lens array cannot be possibly performed as an optical polarization mechanism of lens devices or further successfully modified to provide an optical polarization mechanism of lens devices.

Further, Taiwanese Patent Publication No. TW-1709761, entitled "Optical lens having a laser-induced periodical microstructure," discloses an optical lens having a laser-induced periodical microstructure. The optical lens having the laser-induced periodical microstructure is formed from an optical lens device.

The optical lens is selected from a single-piece member, with the optical lens having a flat surface and a curved surface provided on opposite surfaces thereof. The curved surface of the optical lens is induced by a laser to form a laser-induced periodical surface microstructure.

The laser-induced periodical surface microstructure has a microstructure arrangement and a microstructure size, with the microstructure arrangement formed from a plurality of structure members which are in a periodical arrangement, with the microstructure size formed from a spaced width ranging between 50 nm and 1000 nm, with the microstructure size formed from a height ranging between 50 nm and 500 nm.

However, the above-mentioned laser-induced periodical surface microstructure of the optical lens is not an optical grating structure for polarization such that it cannot be possibly performed as an optical polarization mechanism of lens devices or further successfully modified to provide an optical polarization mechanism of lens devices.

Further, Taiwanese Patent Publication No. TW-1611217, entitled "Lens having microstructures," discloses a lens device having microstructures. The lens device having microstructures has a first surface and a second surface, with the first surface having a central portion thereof.

Provided at the central portion of the first surface is an optical portion which has an optical mechanism portion. Defined around the optical portion is the optical mechanism portion. At least one part of optical mechanism portion is formed with at least one recessed microstructure which has a bottom surface. The bottom surface is a rough surface formed by laser processing.

However, the above-mentioned recessed microstructure of the lens is not an optical grating structure for polarization such that it cannot be possibly performed as an optical polarization mechanism of lens devices or further successfully modified to provide an optical polarization mechanism of lens devices.

Further, Taiwanese Patent Publication No. TW-M519748, entitled "E," discloses a lens device having microstructures. The lens device having microstructures has a first surface and a second surface, with the first surface having a central portion thereof.

Provided at the central portion of the first surface is an optical portion which has an optical mechanism portion. Defined around the optical portion is the optical mechanism portion. At least one part of optical mechanism portion is formed with at least one recessed microstructure which has a bottom surface. The bottom surface is a rough surface formed by laser processing.

The lens device having microstructures defines a longitudinal axis which passes through a center of the lens device. The microstructures is selected from a plurality of annular grooves, a plurality of grooves or a spiral groove. The plurality of annular grooves surround the longitudinal axis and extend along the longitudinal axis. The plurality of annular grooves are concentric annular grooves which are spaced apart among them. The plurality of grooves also surround the longitudinal axis and also extend along the longitudinal axis. The spiral groove also extends along the longitudinal axis to form a spiral structure.

However, the above-mentioned recessed microstructure of the lens is not an optical grating structure for polarization such that it cannot be possibly performed as an optical polarization mechanism of lens devices or further success-fully modified to provide an optical polarization mechanism of lens devices.

Further, Taiwanese Patent Application Publication No. TW-201719241, entitled "Eyeglasses having a microstruc-ture of an optical structure," discloses an eyeglasses having a microstructure of an optical structure which comprises a basic lens and a corrective lens.

The basic lens and the corrective lens are combined to form a single piece member which is formed as a single-piece shape lens. The basic lens has a microstructure which includes a plurality of predetermined notches or a concave and convex curved surface. The plurality of predetermined notches are concentric notches and the microstructure of the concave and convex curved surface has various angles.

However, the above-mentioned microstructure of the eye-glasses is not an optical grating structure for polarization such that it cannot be possibly performed as an optical polarization mechanism of lens devices or further success-fully modified to provide an optical polarization mechanism of lens devices.

However, there is a need of improving the conventional lens devices for providing an optical grating structure per-formed as an optical polarization mechanism of lens device. The above-mentioned patents and patent application publi-cations are incorporated herein by reference for purposes including, but not limited to, indicating the background of the present invention and illustrating the situation of the art.

SUMMARY OF THE INVENTION

The primary objective of this invention is to provide an optical lens device having a physically formed polarization miniature structure and method thereof. A first surface and a second surface are provided on an optical substrate, with physically forming at least one miniature surface structure on the first surface or the second surface of the optical substrate to form an optical polarization layer, with a light ray or a light beam passing through the miniature surface structure of the optical substrate to generate an optical polarization effect. Advantageously, the optical lens device of the present invention is successful in providing an optical grating structure for polarization, reducing a total thickness of lens device, and further increasing eye comfortability and eye protection.

The optical lens device in accordance with an aspect of the present invention includes:

an optical substrate having a first surface and a second surface, with rays or a beam of light capable of pen-etrating through the first and second surfaces of the optical substrate;

at least one optical polarization layer provided on the first surface or the second surface of the optical substrate, with the ray or the beam of light capable of penetrating through the optical polarization layer; and at least one miniature surface structure physically formed on the optical polarization layer to form a miniature-structure polarization grating which provides an optical polarization characteristic;

wherein a polarization effect of the ray or the beam of light is generated while penetrating through the min-iature-structured polarization grating.

The method of an optical lens device having a physically formed polarization miniature structure in accordance with an aspect of the present invention includes:

providing a first surface and a second surface on an optical substrate through which rays or a beam of light to penetrate;

providing at least one optical polarization layer on the first surface or the second surface of the optical substrate, with the ray or the beam of light capable of penetrating through the optical polarization layer;

utilizing a tool to physically form at least one miniature surface structure on the optical polarization layer to form a miniature-structure polarization grating which provides an optical polarization characteristic; and generating a polarization effect of the ray or the beam of light while penetrating through the miniature-struc-tured polarization grating.

In a separate aspect of the present invention, the optical substrate is selected from a single-layer optical substrate or a multiple-complex-layer optical substrate.

In a further separate aspect of the present invention, the miniature surface structure is selected from a sawtooth-shaped miniature structure, a wavy-shaped miniature struc-ture, a groove-shaped miniature structure, a concave-shaped miniature structure, a prism-shaped miniature structure, a convex-shaped miniature structure and combinations thereof.

In yet a further separate aspect of the present invention, the miniature surface structure is formed from a predeter-mined pattern.

In yet a further separate aspect of the present invention, the predetermined pattern is selected from a plurality of concentric rings, a plurality of railings, a plurality of letters and combinations thereof.

In yet a further separate aspect of the present invention, the optical substrate and the optical polarization layer are combined to form as a single-layer optical substrate.

In yet a further separate aspect of the present invention, the miniature surface structure is selected from a regular-distributed miniature surface structure or an irregular-dis-tributed miniature surface structure.

In yet a further separate aspect of the present invention, the miniature surface structure is protruded from the first surface or the second surface of the optical substrate.

In yet a further separate aspect of the present invention, the miniature surface structure is recessed in the first surface or the second surface of the optical substrate.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a schematic side view of an optical lens device having a physically formed polarization miniature structure in accordance with a first preferred embodiment of the present invention.

FIG. 2 is a flow chart of a method of an optical lens device having a physically formed polarization miniature structure in accordance with a preferred embodiment of the present invention.

DETAILED DESCRIPTION OF THE INVENTION

Figure 3:
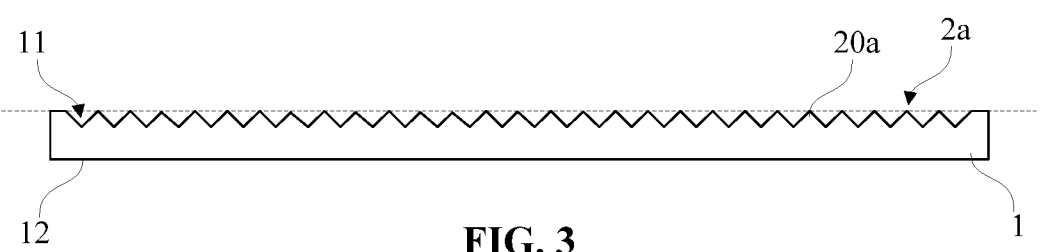
FIG. 3 is a schematic side view of an optical lens device having a physically formed polarization miniature structure in accordance with a second preferred embodiment of the present invention.

It is noted that an optical lens device having a physically formed polarization miniature structure and operation or manufacturing method thereof in accordance with the preferred embodiment of the present invention can be applicable to various glasses (including rimless glasses), various sunglasses, various smart glasses, various sport glasses (including motorcycle-riding glasses), various goggles, various 3D glasses devices, various VR wearable glasses devices, various AR wearable glasses devices or other optical devices such as sensor lens devices, camera lens devices, computer display glasses or TV screen glasses, which are not limitative of the present invention.

FIG. 1 shows a schematic side view of an optical lens device having a physically formed polarization miniature structure in accordance with a first preferred embodiment of the present invention. Referring now to FIG. 1, the optical lens device in accordance with the first preferred embodiment of the present invention includes an optical substrate 1, at least one first optical polarization layer 2a, at least one first miniature structure 20a or at least one first microstructure.

With continued reference to FIG. 1, by way of example, the optical substrate 1 is selected from a single-layer optical substrate or a multiple-complex-layer optical substrate, with the optical substrate 1 having a uniform thickness selectively made of a glass material, a plastic material, an eco-friendly plastic material, a macromolecule material, a PC (polycarbonate) material, a PMMA (poly(methyl methacrylate)) material, a nylon material or similar materials.

Still referring to FIG. 1, by way of example, the optical substrate 1 is selected from another polarization layer, an anti-reflection layer, a photochromic material, anti-blue layer, anti-blue UV layer, an anti-infrared layer or other functional layer (e.g., anti-fog layer or scratch resistant layer) or combinations thereof.

Still referring to FIG. 1, by way of example, the first optical polarization layer 2a and the first miniature structure 20a have a miniature specification (e.g., miniature width, miniature depth, miniature height or other sizes) to form a miniature grating structure, thereby the first miniature structure 20a providing a function of optical polarization in the first optical polarization layer 2a FIG. 2 is a flow chart of a method of an optical lens device having a physically formed polarization miniature structure in accordance with a preferred embodiment of the present invention. Turning now to FIGS. 1 and 2, by way of example, the method of an optical lens device having a physically formed polarization miniature structure includes the step S1: providing a first surface (i.e., front-side surface) 11 and a second surface (i.e., rear-side surface) 12 on the first optical substrate 1 through which rays or a beam of light can be penetrated.

Still referring to FIGS. 1 and 2, by way of example, the method of an optical lens device having a physically formed polarization miniature structure includes the step S2: providing one or more of the first optical polarization layers 2a on the first surface (i.e., front-side surface) 11 or the second surface (i.e., rear-side surface) 12 of the optical substrate 1 in an integrated manner with similar or different refractive indexes or colors, with the ray or the beam of light capable of penetrating through the first surface and second surface of the optical polarization layer 2a. The first optical polarization layer 2a is integrated into the optical substrate 1 (e.g., between front and rear surfaces) which is selected from a single-layer optical substrate or a multiple-complex-layer optical substrate.

With continued reference to FIGS. 1 and 2, by way of example, in another preferred embodiment, two first optical polarization layers 2a are provided on the first surface (i.e., front-side surface) 11 and the second surface (i.e., rear-side surface) 12 of the optical substrate 1 in an integrated manner to form a double-sided optical polarization substrate, with the two first optical polarization layers 2a provide optical polarization in different angular directions of light.

Still referring to FIGS. 1 and 2, by way of example, the method of an optical lens device having a physically formed polarization miniature structure includes the step S3: utilizing a tool (e.g., extrusion molding device or other devices) to physically form the first miniature structure 20a (e.g., miniature surface structure) on the first optical polarization layer 2a to form a miniature-structure polarization grating (or grating barrier) which provides an optical polarization characteristic and a degree of light transmittance.

Still referring to FIGS. 1 and 2, by way of example, in forming the first optical polarization layer 2a and the first miniature structure 20a may selectively be processed by an extrusion molding procedure, a thermal extrusion molding procedure or other physical processing manner.

Still referring to FIGS. 1 and 2, by way of example, in a preferred embodiment, an extrusion molding device 3 with an extrusion molding surface 30, as best shown in FIG. 1, is applied to form the first optical polarization layer 2a and the first miniature structure 20a on the optical substrate 1.

Still referring to FIGS. 1 and 2, by way of example, the optical substrate 1 and the first optical polarization layer 2a (first miniature structure 20a) made of similar or different refractive indexes or colors of materials are formed in an integrated manner to form as a single-layer substrate to reduce a total thickness and may be made of same material.

Still referring to FIGS. 1 and 2, by way of example, the method of an optical lens device having a physically formed polarization miniature structure includes the step S4: generating a polarization effect of the ray or the beam of light while penetrating through the miniature-structured polarization grating of the first optical polarization layer 2a.

Still referring to FIGS. 1 and 2, by way of example, the first miniature structure 20a with a profile is selected from a sawtooth-shaped miniature structure or the like, with the first miniature structure 20a selected from a regular-distributed miniature surface structure or an irregular-distributed miniature surface structure, with the first miniature structure 20a protruded from the first surface 11 or the second surface 12 of the optical substrate 1, as best shown in dotted line in FIG. 1.

FIG. 3 is a schematic side view of an optical lens device having a physically formed polarization miniature structure in accordance with a second preferred embodiment of the present invention. Turning now to FIG. 3, in comparison with the first embodiment, the optical lens device in accordance with the second preferred embodiment has the first miniature structure 20a recessed in the first surface 11 or the second surface 12 of the optical substrate 1, as best shown in dotted line in FIG. 3.

Figure 4:
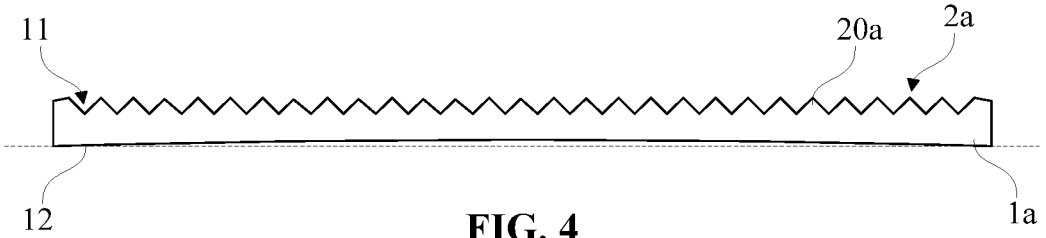
FIG. 4 is a schematic side view of an optical lens device having a physically formed polarization miniature structure in accordance with a third preferred embodiment of the present invention.

FIG. 4 is a schematic side view of an optical lens device having a physically formed polarization miniature structure in accordance with a third preferred embodiment of the present invention. Turning now to FIG. 4, in comparison with the first embodiment, the optical lens device in accordance with the third preferred embodiment is formed with a curved optical substrate 1a which has at least one curved surface, as best shown in dotted line in FIG. 4.

Figure 5:
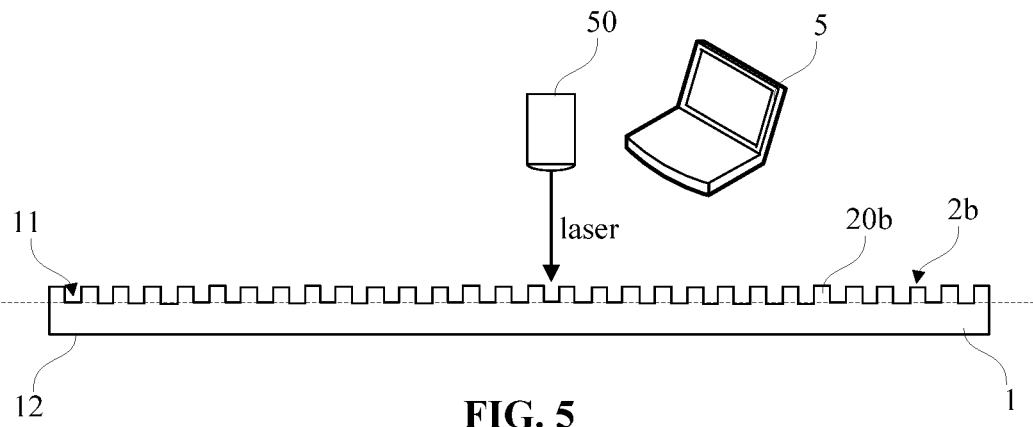
FIG. 5 is a schematic side view of an optical lens device having a physically formed polarization miniature structure in accordance with a fourth preferred embodiment of the present invention.

FIG. 5 is a schematic side view of an optical lens device having a physically formed polarization miniature structure in accordance with a fourth preferred embodiment of the present invention. Turning now to FIG. 5, in comparison with the first embodiment, the optical lens device in accordance with the fourth preferred embodiment includes the optical substrate 1 processed by a laser beam to form a second miniature structure 20b which forms a second optical polarization layer 2b.

Still referring to FIG. 5, by way of example, a laser machine with a laser emitter 50, as best shown in top portion in FIG. 5, is selected to process the second optical polarization layer 2b, with a laser beam or multiple laser beams emitted from the laser emitter 50 to form the second miniature structure 20b of the second optical polarization layer 2b on the optical substrate 1.

Still referring to FIG. 5, by way of example, the laser machine further includes a control unit to control the laser beam emitted from the laser emitter 50 which further includes a filter member or other elements. The laser machine can be selected from a desktop laser machining device, a multi-axis laser machining device or other laser machining devices.

Still referring to FIG. 5, by way of example, the laser beam applied in the present invention has a predetermined laser type, a predetermined wavelength and a predetermined power which can be selected according to various needs. The laser beam further has a predetermined radius or diameter or a dot shape (i.e., circle, ellipse or other suitable shapes).

Still referring to FIG. 5, by way of example, in a preferred embodiment, the optical substrate 1 is initially extruded or thermal-extruded to form a semi-processed miniature structure which is further processed to form an fully-processed miniature structure by a laser beam or other different manners so as to provide a complex miniature structure.

Figure 6:
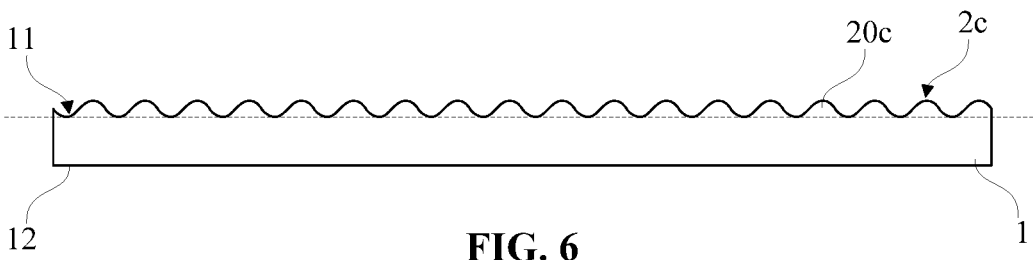
FIG. 6 is a schematic side view of an optical lens device having a physically formed polarization miniature structure in accordance with a fifth preferred embodiment of the present invention.

FIG. 6 is a schematic side view of an optical lens device having a physically formed polarization miniature structure in accordance with a fifth preferred embodiment of the present invention. Turning now to FIG. 6, in comparison with the first embodiment, the optical lens device in accordance with the fifth preferred embodiment includes the optical substrate 1 formed with a third optical polarization layer 2c and a third miniature structure 20c which has a profile of wavy to form a wavy-shaped miniature structure.

Figure 7:
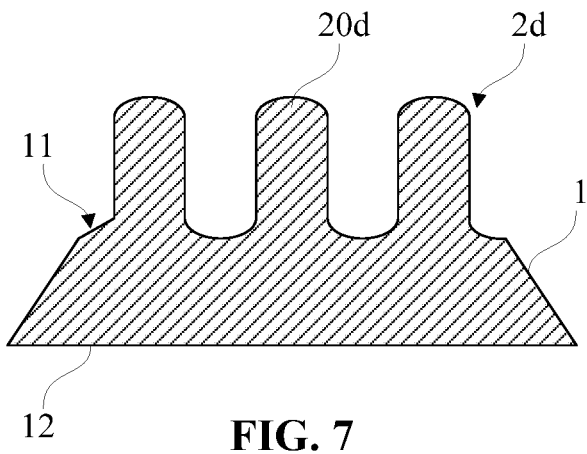
FIG. 7 is a schematic side view of an optical lens device having a physically formed polarization miniature structure in accordance with a sixth preferred embodiment of the present invention.

FIG. 7 is a schematic side view of an optical lens device having a physically formed polarization miniature structure in accordance with a sixth preferred embodiment of the present invention. Turning now to FIG. 7, in comparison with the first embodiment, the optical lens device in accordance with the sixth preferred embodiment the optical substrate 1 formed with a fourth optical polarization layer 2d and a fourth miniature structure 20d which has a profile to form a groove-shaped miniature structure. The fourth miniature structure 20d can be also selected from a concave-shaped miniature structure, a prism-shaped miniature structure, a convex-shaped miniature structure and combinations thereof.

Figure 8A:
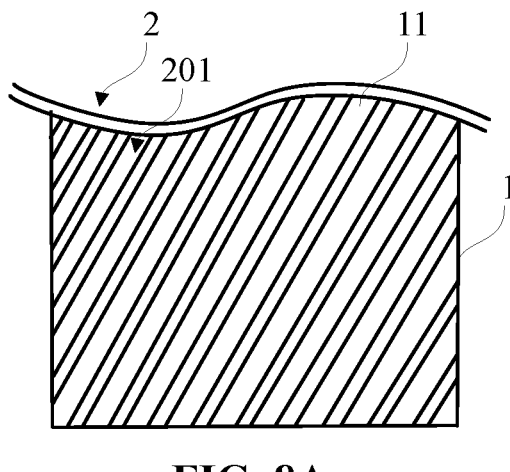
FIG. 8A is a schematic side view of an optical lens device having a physically formed polarization miniature structure with a first pattern of miniature surface structure in accordance with a preferred embodiment of the present invention.

FIG. 8A is a schematic side view of an optical lens device having a physically formed polarization miniature structure with a first pattern of miniature surface structure in accordance with a preferred embodiment of the present invention. Turning now to FIG. 8A, by way of example, the optical substrate 1 selectively has a predetermined pattern to form an optical polarization layer 2, with the predetermined pattern formed from a first miniature structure pattern 201 which is an inclined-groove pattern.

Figure 8B:
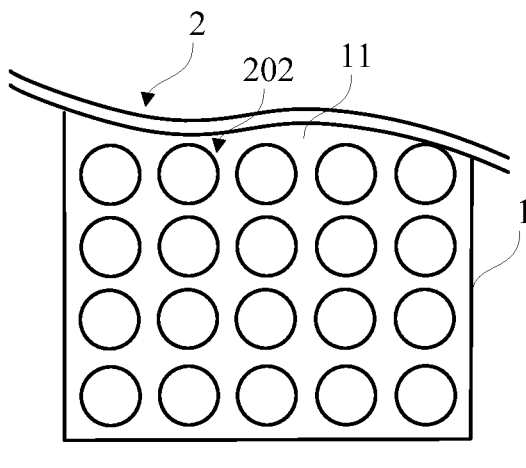
FIG. 8B is a schematic side view of an optical lens device having a physically formed polarization miniature structure with a second pattern of miniature surface structure in accordance with a preferred embodiment of the present invention.

FIG. 8B is a schematic side view of an optical lens device having a physically formed polarization miniature structure with a second pattern of miniature surface structure in accordance with a preferred embodiment of the present invention. Turning now to FIG. 8B, by way of example, the optical substrate 1 selectively has a predetermined pattern to form an optical polarization layer 2, with the predetermined pattern formed from a second miniature structure pattern 202 which is a circle-array pattern.

Figure 8C:
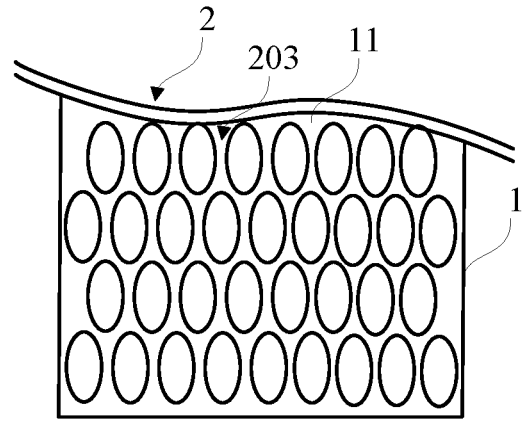
FIG. 8C is a schematic side view of an optical lens device having a physically formed polarization miniature structure with a third pattern of miniature surface structure in accordance with a preferred embodiment of the present invention.

FIG. 8C is a schematic side view of an optical lens device having a physically formed polarization miniature structure with a third pattern of miniature surface structure in accordance with a preferred embodiment of the present invention. Turning now to FIG. 8C, by way of example, the optical substrate 1 selectively has a predetermined pattern to form an optical polarization layer 2, with the predetermined pattern formed from a third miniature structure pattern 203 which is an ellipse-array pattern.

Figure 8D:
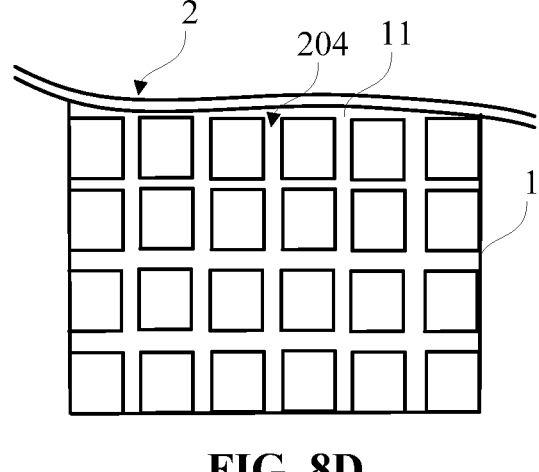
FIG. 8D is a schematic side view of an optical lens device having a physically formed polarization miniature structure with a fourth pattern of miniature surface structure in accordance with a preferred embodiment of the present invention.

FIG. 8D is a schematic side view of an optical lens device having a physically formed polarization miniature structure with a fourth pattern of miniature surface structure in accordance with a preferred embodiment of the present invention. Turning now to FIG. 8D, by way of example, the optical substrate 1 selectively has a predetermined pattern to form an optical polarization layer 2, with the predetermined pattern formed from a fourth miniature structure pattern 204 which is a square-array pattern.

Referring back to FIGS. 8A to 8D, by way of example, in another embodiment, the optical substrate 1 is selected from a plurality of concentric rings, a plurality of railings, a plurality of letters and combinations thereof.

Although the invention has been described in detail with reference to its presently preferred embodiment, it will be understood by one of ordinary skills in the art that various modifications can be made without departing from the spirit and the scope of the invention, as set forth in the appended claims.

What is claimed is:

1. A wearable optical lens device for eye protection comprising:

an optical substrate of wearable lens device having a first surface and a second surface, with rays or a beam of light capable of penetrating through the first and second surfaces of the optical substrate of wearable lens device;

at least one incorporative optical polarization layer provided on the first surface of the optical substrate of wearable lens device to form a total single-layer compact optical substrate, with reducing a total thickness of wearable lens device without adding a separate polarization layer, with the ray or the beam of light capable of penetrating through the incorporative optical polarization layer; and at least one miniature surface structure physically formed for the incorporative optical polarization layer to directly form a miniature-structure polarization grating which provides a miniature-structural optical polarization characteristic between the first surface and the second surface of the optical substrate of wearable lens device, with incorporating the miniature-structure polarization grating into the first surface of the optical substrate of wearable lens device;

wherein a miniature-structural polarization effect of the ray or the beam of light is generated on wearer's eyes while penetrating through the miniature-structured polarization grating, with increasing eye comfortability and eye protection.

2. The wearable optical lens device for eye protection as defined in claim 1, wherein the optical substrate of wearable lens device is selected from a single-layer optical substrate or a multiple-complex-layer optical substrate.

3. The wearable optical lens device for eye protection as defined in claim 1, wherein the miniature surface structure is selected from a sawtooth-shaped miniature structure, a wavy-shaped miniature structure, a groove-shaped miniature structure, a concave-shaped miniature structure, a prism-shaped miniature structure, a convex-shaped miniature structure and combinations thereof.

4. The wearable optical lens device for eye protection as defined in claim 1, wherein the miniature surface structure is formed from a predetermined pattern.

5. The wearable optical lens device for eye protection as defined in claim 4, wherein the predetermined pattern is selected from a plurality of concentric rings, a plurality of railings, a plurality of letters and combinations thereof.

6. The wearable optical lens device for eye protection as defined in claim 1, wherein the optical substrate of wearable lens device and the optical polarization layer are incorporated to form as a single-layer miniature-structure optical polarization grating substrate.

7. The wearable optical lens device for eye protection as defined in claim 1, wherein the miniature surface structure is selected from a regular-distributed miniature surface structure or an irregular-distributed miniature surface structure.

8. The wearable optical lens device for eye protection as defined in claim 1, wherein the miniature surface structure is protruded from the first surface of the optical substrate of wearable lens device.

9. The wearable optical lens device for eye protection as defined in claim 1, wherein the miniature surface structure is recessed in the first surface of the optical substrate of wearable lens device.

10. The wearable optical lens device for eye protection as defined in claim 1, wherein another incorporative optical polarization layer provided on the second surface of the optical substrate of wearable lens device to form a double-sided optical polarization substrate.

11. A method for a wearable optical lens device for eye protection comprising:

providing a first surface and a second surface on an optical substrate of wearable lens device through which rays or a beam of light to penetrate;

providing at least one incorporative optical polarization layer on the first surface of the optical substrate of wearable lens device to form a total single-layer compact optical substrate, with reducing a total thickness of wearable lens device without adding a separate polarization layer, with the ray or the beam of light capable of penetrating through the incorporative optical polarization layer;

utilizing a tool to physically form at least one miniature surface structure for forming the incorporative optical polarization layer to directly form a miniature-structure polarization grating which provides a miniature-structural optical polarization characteristic between the first surface and the second surface of the optical substrate of wearable lens device, with incorporating the miniature-structure polarization grating into the first surface of the optical substrate of wearable lens device; and generating a miniature-structural polarization effect of the ray or the beam of light on wearer's eyes while penetrating through the miniature-structured polarization grating between the first surface and the second surface of the optical substrate of wearable lens device, with increasing eye comfortability and eye protection.

12. The method for the wearable optical lens device as defined in claim 11, wherein the optical substrate of wearable lens device is selected from a single-layer optical substrate or a multiple-complex-layer optical substrate.

13. The method for the wearable optical lens device as defined in claim 11, wherein the miniature surface structure is selected from a sawtooth-shaped miniature structure, a wavy-shaped miniature structure, a groove-shaped miniature structure, a concave-shaped miniature structure, a prism-shaped miniature structure, a convex-shaped miniature structure and combinations thereof.

14. The method for the wearable optical lens device as defined in claim 11, wherein the miniature surface structure is formed from a predetermined pattern.

15. The method for the wearable optical lens device as defined in claim 14, wherein the predetermined pattern is selected from a plurality of concentric rings, a plurality of railings, a plurality of letters and combinations thereof.

16. The method for the wearable optical lens device as defined in claim 11, wherein the optical substrate of wearable lens device and the optical polarization layer are incorporated to form as a single-layer miniature-structure optical polarization grating substrate.

17. The method for the wearable optical lens device as defined in claim 11, wherein the miniature surface structure is selected from a regular-distributed miniature surface structure or an irregular-distributed miniature surface structure.

18. The method for the wearable optical lens device as defined in claim 11, wherein the miniature surface structure is protruded from the first surface of the optical substrate of wearable lens device.

19. The method for the wearable optical lens device as defined in claim 11, wherein the miniature surface structure is recessed in the first surface of the optical substrate of wearable lens device.

20. The method for the wearable optical lens device as defined in claim 11, wherein another incorporative optical polarization layer provided on the second surface of the optical substrate of wearable lens device to form a double-sided optical polarization substrate.

* * * * *